United States Patent [19]

Brunner et al.

[11] Patent Number: 5,550,971

[45] Date of Patent: Aug. 27, 1996

[54] METHOD AND SYSTEM FOR GENERATING A USER INTERFACE ADAPTABLE TO VARIOUS DATABASE MANAGEMENT SYSTEMS

[75] Inventors: Hans Brunner, Denver; Timothy P. McCandless, Boulder; Randall B. Sparks, Louisville; Robert J. Cuthbertson, Boulder; Jacques Durand, Louisville; Steven M. Fogel, Denver, all of Colo.

[73] Assignee: U S West Technologies, Inc., Boulder, Colo.

[21] Appl. No.: 460,193

[22] Filed: Jun. 2, 1995

Related U.S. Application Data

[63] Continuation-in-part of Ser. No. 86,330, Jun. 30, 1993, abandoned.

[51] Int. Cl.$^6$ .............................. G06F 17/30; G06F 3/14
[52] U.S. Cl. ........................ 395/161; 395/600; 395/155
[58] Field of Search ................................. 395/161, 600, 395/155, 140, 159, 160, 149, 12, 62–64, 54, 76

[56] References Cited

U.S. PATENT DOCUMENTS

| | | | |
|---|---|---|---|
| 4,939,689 | 7/1990 | Davis et al. | 395/600 |
| 5,047,959 | 9/1991 | Phillips et al. | 395/160 |
| 5,202,985 | 4/1993 | Goyal | 395/600 |
| 5,263,167 | 11/1993 | Conner, Jr. et al. | 395/161 X |
| 5,459,860 | 10/1995 | Burnett et al. | 395/600 |
| 5,497,491 | 3/1996 | Mitchell et al. | 395/600 X |

OTHER PUBLICATIONS

"Objects and Views", Sege Abiteboul, Anthony Bonner, Inria, 78153 Le Chesnay, France pp. 238–247 Proc. of ACM–SIGMOD, 1991.

"Queries and Views in an Object–Oriented Data Model", Umeshwar Dayal, Cambridge, MA, pp. 80–102, 2nd Int. Workshop on Database Programming Languages, Oregon, 1989.

"Perspectives of a Semantic Schema", Susan Darling Urban and Lois M. L. Delcambre, 1987, Lafayette, LA, pp. 485–492, Proc. of the 3d Int'l. Conf. on Data Engrg., Los Angeles.

"Open Books Product Description", Open Books, Inc., Feb. 14, 1991 Ver. 2.5, pp. 1–13.

"An Introduction to Hits: Human Interface Tool Suite", James Hollan et al., pp. 1–52 MCC Technical Report ACA–HI–406–88.

(List continued on next page.)

*Primary Examiner*—Raymond J. Bayerl
*Attorney, Agent, or Firm*—Brooks & Kushman P.C.

[57] ABSTRACT

A method and system for generating a user interface in a database management system. A semantic data model is used to describe a database in terms of data types stored in the database and functional types that describe relationships between the data types stored in the database. The system dynamically queries the data model to generate a graph of the data model itself. These queries are initiated by the system without user intervention. The user selects a node on the graph that causes the data model to be searched again to determine the name of the node selected, one or more types of relationships associated with the node selected and one or more instances of the relationships associated with the node selected. This information is used to generate a form containing a plurality of blanks. A user enters a query constraint into one or more of the blanks and the database is searched for instances of data meeting the query constraints. The data model is easily adaptable to reflect changes in the architecture of the database. The user interface reflects those changes without the need to recode or recompile the software that generates the user interface. Also because the data model is semantically the same throughout, the same functions can query the data model itself as well as the data represented by the data model.

19 Claims, 6 Drawing Sheets

OTHER PUBLICATIONS

"A Graphical Data Manupulation Language for and Extended Entity–Relationship Model", 1990, Bogdan Czejdo et al., pp. 26–35, IEEE Computer.

"The Design of KIVIEW: An Object–Oriented Browser", Amihai Motro et al., pp. 17–31 Proceedings of the 2nd Int'l. Conf. on Expert Data Systems, Virginia, 1988.

"Incorporating A Model Hierarchy Into the ER Paradigm", 1990 U S West Advanced Technologies, Jianhua Zhu et al., pp. 1–20, 9th Conf. on Entity Relationship Approach, 1991.

"Simplifying Complex Objects: The PROBE Approach to Modelling and Querying Them", Umeshwar Dayal et al., Cambridge, MA, pp. 390–399, Int'l. Workshop, Darmstadt, West Germany, Apr. 1987.

"Extending the Functional Data Model to Computational Completeness", Alexandra Poulovassilis et al., London, England, pp. 75–90, Proc. of EDBT '90, Mar. 1990.

"On Representation of Medical Knowledge by a Binary Data Model", Naphtali Rishe, Santa Barbara, CA, 1987, pp. 623–626, 5th Int'l. Conf., Eds. Pergamon Press, Elmsford, N.Y., 1986.

"Semantic Database Modeling: Survey, Applicatinos, and Research Issues", Richard Hull et al, 1987, pp. 202–257, ACM Computing Surveys, 1987, vol. 19, Numb. 3, pp. 208–211.

"A Query Algebra for Object–Oriented Databases", 1990, Gail M. Shaw et al., Providence, RI, pp. 154–161, 2nd Int'l. Workshop on Database Programming Languages. Morgan Kaufman pub., 1989.

"Fragmentation and Query Decomposition in the ECR Model", R. Elmasri et al., 1987, pp. 468–475, 3d Int'l. Conf., IEEE, Computer Society Press, CA.

METHOD AND SYSTEM FOR GENERATING A USER INTERFACE ADAPTABLE TO VARIOUS DATABASE MANAGEMENT SYSTEMS

CROSS-REFERENCE TO RELATED APPLICATIONS

This application is a continuation-in-part of U.S. patent application Ser. No. 08/086,330, filed Jun. 30, 1993, now abandoned, entitled "Model-Based Information Access System", which has, at all times relevant hereto, been commonly owned with the present application.

TECHNICAL FIELD

The present invention relates to a computer system for generating a user interface for a database management system.

BACKGROUND ART

As computers and computerized database systems become more prevalent in the modern business environment, the information stored in such systems becomes an increasingly valuable corporate asset. A large corporate database system typically stores such standard data as customer lists, account balances, payment schedules, as well as a host of other information that can only be obtained by interpreting the standard data such as customer spending patterns, customer preferences, etc. The ability to effectively use and interpret all the information stored in a database can give a company an edge over its competitors.

Despite the theoretical value of the information stored in a database, as a practical matter, the information is only as valuable as it is accessible. Presently, large databases such as those used by a business are typically operated using complex database management systems. These systems typically have their own unique query language that not only depends upon the architecture of the database, whether it be object-oriented, relational, or hierarchical, etc., but also can vary according to the manufacturer of the database management system. Before a user can store and retrieve data with a database management system, it is often necessary to learn how to use the particular user interface for the database and/or the particular query language provided by the manufacturer of the system. The training is not only time consuming but must often be repeated if a company uses several different database systems that have a different user interface and query language.

One of the more common types of user interfaces provided by a database management system is a form-based interface. In order to use and search such a database, a user is shown a pictorial representation of a form on a video terminal. The particular form shown is related to the data or information that is being searched. For example, if a user wishes to search the database for a particular customer, a form is generated by the user interface that contains blanks for the customer's name, address, account balance, etc. The customer then enters data into one or more of the blanks. The data entered into the blanks define a set of query constraints that are combined to create a database query. The database query is then executed by the database management system to retrieve all instances of the stored data meeting the query constraints.

The biggest impediment to creating database interfaces that are easier to use and more uniform from one database to another is the fact that the computer software that generates the user interface is coupled to the structure of underlying data stored in the database. This is often the case because the manufacturer of the database management system first determines how the data will be stored on the database and what relationships are possible between the various data items. Once the architecture of the database has been designed, the manufacturer then designs a user interface that reflects the database architecture, or that generates queries in a data manipulation language that is specific to the architecture of the database. However, if the underlying data structure of the database is changed by adding a new field or changing a relationship between the various items of data stored, the software that generates the user interface must be recoded and recompiled in order to reflect the change in the database structure.

In the form-based user interface described above, if a new type of data is added or a new relationship is defined among the data stored, the software that generates the forms must be recoded and recompiled to reflect changes in the forms produced. Often the relationships between stored data and the corresponding user interface are subtle and a change may affect the user interface in non-obvious ways. Therefore, a significant amount of debugging may be required before the user interface properly reflects a change made in the underlying database.

To overcome the problem of requiring a user to learn a new user interface and/or the underlying query language of a database before a user can use a database, it is desirable to generate a database user interface that is not tightly coupled to the structure of the underlying data. The user interface should be flexible so that if a change is made to the underlying database schema or model, the interface will adapt dynamically to reflect the change without the need to recode and recompile the software that generates the user interface. Additionally, the database interface should be adaptable to work with various types of database systems, thereby allowing a user to use the same database user interface regardless of the database's query language or underlying modeling constructs.

SUMMARY OF THE INVENTION

It is thus a general object of the present invention to provide a method and system for generating a user interface that is adaptable to various database systems.

It is another object of the present invention to provide a method and system for generating a flexible user interface that dynamically adapts to the underlying database schema without the need to recode or recompile the software that generates the user interface.

It is yet another object of the present invention to provide a method and system for generating a user interface that is adaptable to various database systems regardless of the database's query language or underlying modeling constructs.

In carrying out the above objects and other objects, features and advantages of the present invention, a method is provided for generating a user interface adaptable to various database management systems. The method includes the step of generating an intermediate data model having a model and a meta-model describing a plurality of data items as instances of either a data object type or a functional object type. The data object type represents a type of data contained in the database, and the functional object type represents a plurality of relationships existing between instances of the plurality of data object types. The method also includes the step of executing a plurality of internal dialogs to retrieve data representing a plurality of entity object types, a plurality of relationship object types, a plurality of entities and a plurality of relationships so as to determine the model and the meta-model of the intermediate data model. The method further includes the step of generating the user interface based on the data retrieved by the internal dialogs. Still further, the method includes the step of displaying the user interface.

In further carrying out the above objects, and other objects, features and advantages of the present invention, a system is also provided for carrying out the steps of the above-described method. The system includes a database containing a plurality of data items. The system also includes a computer system, coupled to the database for generating the intermediate model, for executing the internal dialogs and for generating the user interface. Still further, the system includes a display, coupled to the database and the computer system, for displaying the user interface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

BEST MODES FOR CARRYING OUT THE INVENTION

As described above, the primary problem with prior art database user interfaces is that they are unique to each database due to the particular query language and its tight coupling to the architecture or schema of the underlying database. If the architecture or schema was changed, it has been necessary to recode the software that generated the user interface in order to reflect the change to a user. To solve these problems, the present invention is a system and method for generating a user interface in a way that is not directly coupled to or dependent on the query language or structure of the underlying database. The present invention thus utilizes, as support for the user interface design and generation, an intermediate data model that is distinct from the underlying database. The flexibility with the user interface is achieved by mapping the data model to the database architecture. The data model is a semantic model that is dynamically analyzed in order to generate the user interface. The semantic data model is easily modified or updated to reflect changes in the underlying database. By dynamically querying that data model, any changes to the schema of the underlying database are easily reflected in the user interface.

In order to help the reader understand the present invention, an example of how the present invention generates a user interface for a small, simplified database is given. The database in the example could be typical of a database kept by a law firm. Stored in the database is information regarding various clients, patent applications filed by each client, and information regarding different litigation matters in which the clients may be involved. As will be appreciated by those skilled in the computer programming/database arts, the concepts illustrated by the example are merely for purposes of illustration. The present invention can be applied to any object-oriented or relational database regardless of complexity.

Figure 1:
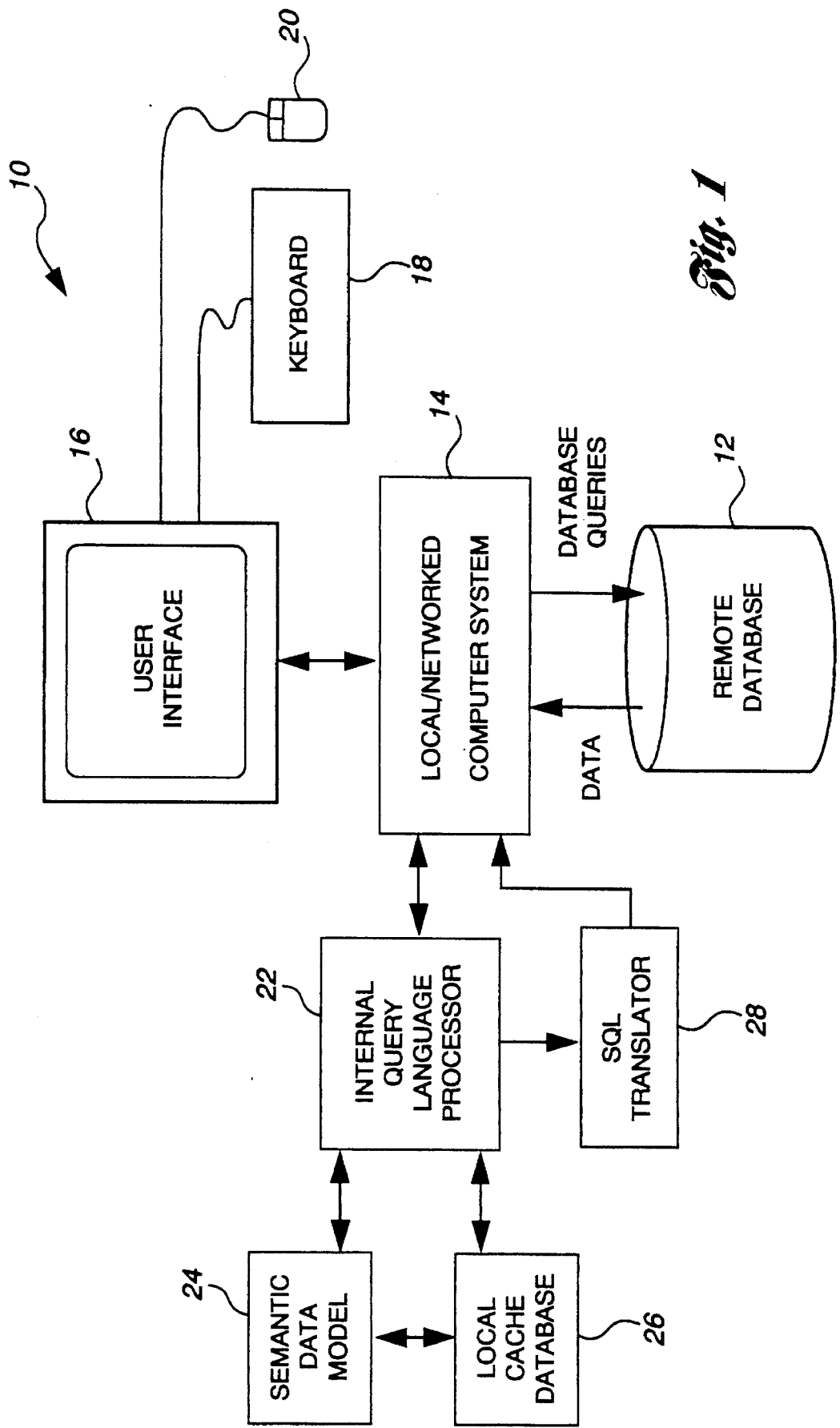
FIG. 1 is a generalized block diagram of a database system according to the present invention.

FIG. 1 is a block diagram of a database management system 10 according to the present invention. The system includes one or more remote databases 12 that store large amounts of information. The database 12 typically includes its own central processing unit and memory (not separately shown) that are used to store and retrieve data in response to database queries. The queries to the remote database 12 are sent from a local/networked computer system 14 and are written in the remote database's own query language. Upon receiving a query in the appropriate query language, the data stored in the database are searched and the data fitting the search criteria specified by the query are transmitted from the remote database 12 back to the local/networked computer system 14. Although the term "remote database" is used to reflect the fact that such databases are not usually maintained on the local/networked computer system 14, there is no reason the database could not be maintained on the computer system 14 if the computer system has sufficient memory and computing power.

The local/networked computer system 14 has associated with it an internal query processor 22. The internal query processor 22 translates a series of commands or query constraints-entered by a user into a new set of commands that efficiently query a semantic intermediate data model 24. As will be further described below, the intermediate data model 24 describes the type of data and the various relationships that exist in the data stored in the database 12. The user interface is driven by the intermediate data model. If a change is made to the data schema in the database 12, the semantic database model and/or the definition of its mapping to the remote database are the only parts of the database management system 10 that need to be updated in order to reflect the change in the user interface. All these changes can be made at run time without recompiling.

The local/networked computer system 14 further includes a local cache database 26. This local cache database is used for two purposes. First, the local cache database is used to store the search results of queries received from the remote database 12. If the query constraints that produced the search results are narrowed, it is more efficient to only search the data stored in the local cache database 26 rather than performing a new search on the remote database 12. The second purpose of the local cache database is to implement data layer of the semantic data model 24 that is used to instruct the database management system 10 how to generate the user interface. In the present embodiment of the invention, the local cache database 26 is implemented using a commercially available, object-oriented knowledge representation system ROCK™ manufactured by Carnegie Group, Inc. Finally, the local/networked computer system 14 includes an SQL translator 28. The SQL translator converts query constraints entered into the user interface into the query language of the remote database 12. The design of the SQL translator is considered to be well known to those of ordinary skill in the database programming art and therefore will not be discussed further.

Also included in the database management system 10 are one or more video terminals 16 that have associated with them input devices such as a keyboard 18 and a mouse 20. Displayed on the video terminal 16 is the user interface that allows a user of the database system to store and retrieve data. As described above, the present invention is directed to a method of generating the user interface in a way that is not directly coupled to (i.e., dependent upon) the particular query language or technology of the database 12. By dynamically interpreting the semantic data model there is no need to recompile the software that generates the user interface in order to accommodate architecture or schema changes in the database 12.

Figure 2:
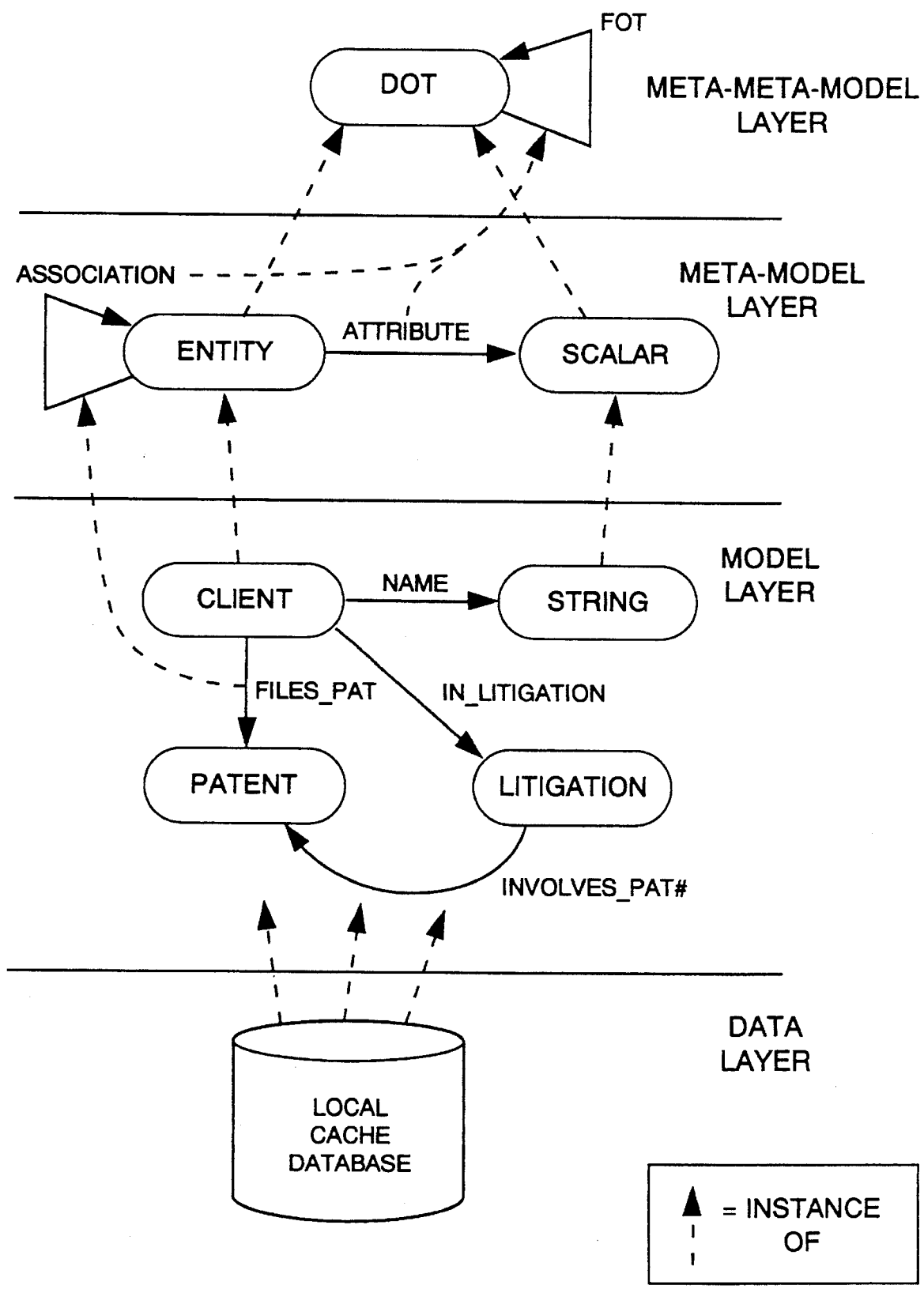
FIG. 2 is a schematic diagram of a semantic data model used by the present invention to describe a remote database and generate a user interface.

FIG. 2 illustrates the semantic data model used by the present invention to generate the user interface. The semantic data model is separated into three distinct layers: the meta-meta-model layer, the meta-model layer, and the model layer, all of which describe the architecture of the data stored in the remote database. Each layer of the semantic data model is an abstraction of the layer below it, i.e., the meta-meta-model layer is an abstraction of the meta-model layer, which is in turn an abstraction of the model layer, etc. As will be described in further detail below, the present invention interprets the semantic data model in order to generate the user interface. It is the semantic data model that dynamically dictates how the interface user will appear in contrast to prior art database management systems whereby a fixed computer program generates the same user interface each time the program is executed.

At its most fundamental level, the meta-meta-model layer describes the remote database entirely in terms of two different data types. The first data type is a data object type (DOT) that represents the most generic type of data stored in the database. The second is a functional object type (FOT) that represents or describes relationships that exist between the data object types (DOTs). Every item of data or relationship stored in the database is an instance of either a DOT or a FOT object type. As will be illustrated below, with the present invention, the software that generates the user interface only needs to know the details of the meta-meta-model layer, i.e., that the database is described in terms of DOTs and FOTs, in order to dynamically query the database model itself and generate the user interface.

The next layer of the semantic data model is the meta-model layer. The meta-model layer is an abstract description of the various object types and relationships between the object types that are stored in the particular remote database being modeled. The example shown in FIG. 2 models a database maintained by a law firm. The meta-model layer is defined as having two data types, ENTITY and SCALAR, which are themselves instances of the data object type (DOT) defined in the meta-meta-model layer. Instances of the ENTITY type are complex data structures having more than one data component or attribute. Instances of the SCALAR type are objects like integers, characters, floating point numbers, etc., that define the data components or attributes of an instance of Entity type. The meta-model layer also includes two instances of the FOT data type, namely ASSOCIATION and ATTRIBUTE. Instances of the ASSOCIATION type are objects that define relationships between an instance of an ENTITY-type and another instance of un ENTITY-type (or the same instance of un ENTITY-type in the case of a recursive relationship). Instances of the ATTRIBUTE type are objects that define relationships between un instance of an ENTITY-type and an instance of a SCALAR type. Both the ASSOCIATION and ATTRIBUTE data types are instances of the FOT object type described above, and correspond to semantic relationships in semantic modeling technology.

The next layer of the semantic data model is the model layer. The model layer defines instances of the ENTITY, SCALAR, ATTRIBUTE and ASSOCIATION types that are defined in the meta-model layer. In the present example, there are three instances of the ENTITY type: CLIENT, PATENT, and LITIGATION. Each of these instances of the type ENTITY may have associated with it one or more instances of the ATTRIBUTE data type. For example, each CLIENT object has an instance of the ATTRIBUTE type called "name" that relates the CLIENT object to a STRING object that stores the name of a client as a series of characters. The STRING type is itself an instance of the SCALAR type defined in the meta-model layer. Typically, each instance of the ENTITY type has many instances of the ATTRIBUTE types associated with it. However, for purposes of illustration, only one is shown in FIG. 2. The semantic data model shown includes three instances of the type ASSOCIATION. "Files_pat" relates an instance of a CLIENT type to an instance of a PATENT type. "In litigation" relates an instance of a CLIENT type to an instance of a LITIGATION type. Finally, "Involves_pat#" relates an instance of a LITIGATION type to an instance of a PATENT type.

In the present embodiment of the invention, the database 12 shown in FIG. 1 is a relational-type database that stores data in a series of tables. In the example database described above, there are three different data types. The CLIENT data type in the data model maps to a plurality of tables in the remote database having six entries used to define a particular CLIENT as follows:

table CLIENT
        NAME: CHAR(20)*
        ADDRESS: CHAR(50)
        PHONE: CHAR(12)
        FAX: CHAR(20)
        CLIENT_ID: CHAR(10)*
        FILE NO: CHAR(7)*

The entries marked by an asterisk identify keys that are unique to a particular instance of the CLIENT type. Thus, for a given Client_Id or File_No entry, there corresponds only one instance of a CLIENT data type in the database.

The database 12 in the present example also includes tables that are mapped to the PATENT and the LITIGATION data types in the data model that are set up as follows:

table PATENT
        PATENT_NO: DECIMAL (10)*
        SERIAL_NO: DECIMAL (10)*
        FILED_ON: DATE
        INVENTOR_NAME: CHAR(20)
        IN_ADDR: CHAR(50)
        ASSIGNED_TO: CHAR(50)
        DESCRIPTION: CHAR(50)
        CLIENT_ID: CHAR(10)
        FILE_NO: CHAR(7)*
    table LITIGATION
        CASE_NO: CHAR(15)*
        COURT_ID: CHAR(10)

DESCRIPTION: CHAR(75)
DEFENDANT: CHAR(50)
OPP_COUNSEL: CHAR(25)
CLIENT_ID: CHAR(10)
FILE_NO: CHAR(7)*

The database also includes a number of tables that are used to relate one type of data in the database to another type of data in the database. For example, a table that relates a Client to a Patent entry in the database is:

tableFILES$_{PAT}$
   CLIENT_ID: CHAR(10)
   SERIAL_NO: DECIMAL(10)

By inserting the appropriate Client_Id and Serial_No entry into the table, it is possible to search the remote database for all patent applications filed by a particular client. Similarly, given any patent application serial number, it is possible to use the FILES_PAT table to determine what client filed a particular patent application. The FILES_PAT table may include more than one Serial_No entry if the client has filed more than a single patent application.

Other tables in the database include:

table IN-LITIG
   CLIENT_ID: CHAR(10)
   CASE_NO: CHAR(15)

table INVOLVES_PAT#
   CLIENT_ID: CHAR(10)
   CASE_NO: CHAR(15)
   PAT_NO: DECIMAL(10)

The IN_LITIG table relates a client entry in the database to a litigation entry in the database, while INVOLVES_PAT# is a table that relates a litigation entry in the database to a client entry and a patent entry in the database.

It is not always sufficient to implement relationship by just having such entities importing attribute keys of another. Sometimes intermediate relationship tables are used that contain identifiers to indirectly relate two entities (this is the case for "many to many" relationships). In the semantic data model, the FOTs can map to either kind of relationship table in order to represent the various relationships between the data types in the database.

The semantic data model 24 is created using an object-oriented programming language. As can be seen from FIG. 2, the data model requires the use of objects that are themselves classes of objects as well as instances of other classes of objects. For example, the ENTITY object is both a database class as well as being an instance of the DOT database class described above. Traditional object-oriented programming languages do not allow for the creation of classes that are instances of other data classes. However, the present invention simulates such a feature in a conventional object-oriented programming language by creating all the classes, objects, and relationships in the data model (with the exception of the objects in the data layer of the data model as will be described below) as instances of two unique object classes (one for DOTs and one for FOTs).

The data model is created using the programming language C++. In order to create classes of objects that are at the same time instances of other classes, each database model class includes a list of objects (instanceset) that are considered by the database model to be instances of the database model class. For example, the ENTITY and CLIENT classes found in the model layer of the database model are actually created as instances of the same C++ class. However, a CLIENT class can be made to appear in the data model to be an instance of the Entity class by including the CLIENT object in the instanceset list maintained by the ENTITY object.

The following shows how the data model is created using the C++ programming language. As will be apparent to those skilled in the art, other object-oriented languages could be used equally as well. In fact, it would be easier to create the model using a programming language that allows the creation of classes which are also instances of other classes. However, such languages are not currently known to be commercially available and supported. In the C++ implementation of the present invention, the data model is created using seven C++ classes (as distinguished from the data model classes shown in FIG. 2). These C++ classes are used to implement the data model set forth below. The entire C++ program for these classes is not shown. Only those aspects which are needed for a complete understanding of the invention are discussed. For example, the text of some of the functions is not given but should be readily apparent to one of ordinary skill in the art of computer programming.

```
/*==============================
class DOT {
/*==============================
/*
    This class is to be used for implementing
    any DOT in any of the data model layers,
    i.e., any DOT object in the data model is
    a C++ instance of this generic class. To
    instantiate a class of objects in the
    data model which is an instance of another
    class in the data model involves the
    creation of a new instance of the DOT C++
    class. Then this new C++ object is added
    to a list (*instanceset) of objects
    maintained by the C++ object which is
    defined as the type of the new C++ object.
    Therefore, each C++ object which
    is defined in the data model as a class
    type includes a list of all the C++
    objects which are considered as instances
    of the type. In this way, it is possible
    to build a data model having objects that
    are simultaneously both class types and
    instances of other class types even
    though all objects in the data model are
    implemented using the same C++ class.
/*
public
    /* constructor & destructor */
    DOT (char *name);
    ~DOT( );
    /* create an instance of the class called
    nameDOT */
    DOT *Instantiate(char *nameDOT);
    /* create an instance of type DO for this DOT,
    i.e., corresponding to some data in a
    database. There is a "model level" checking:
    this can be done only if the modeling layer is
    2 (i.e., if this DOT is in the model layer) */
    void Instantiate (DO *adataobject);
    DO *Instantiate (List *attributes, List
    *types, List *values);
    /* tell if iddot is an instance of this DOT */
    int HasInstance (DOT *iddot);
    /* return all the DOTs related to this one by
    a FOT*/
    DOT *RelatesTo(FOT *idFOT);
    DOT *RelatesTo(char *nameFOT);
    /* get all the FOTs related to this DOT (using
    the DOT either as domain or range, or only as
    domain, or only as range). The optional
    argument gives the FOT type of which the
    selected FOTs must be instances */
    FOTset *GetAllRelated FOTs (FOT *typeFOT =
    NULL);
    FOTset *GetDomainRelated FOTs (FOT *typeFOT =
    NULL);
    FOTset *GetRangeRelated FOTs (FOT *typeFOT =
    NULL);
```

```
    /* apply a function (= FOT) to this DOT, taken
    as argument. This method stands for the "meta-
    function" that has to be provided by the model
    in order to be used as functional data-model
    */
    virtual QResult *ApplyFunction(FOT *idFOT);
    virtual QResult *ApplyFunction(char *nameFOT);
    /* add a FOT to the fots_from, fots_to sets */
    void AddFotFrom(FOT *fot);
    void AddFotTo(FOT *fot);
    /* get all the instances of this DOT */
    virtual DOTset *GetInstances( );
    /* get the type of this DOT */
    DOT *GetType( );
    char *GetName( );
    DOT *GetOID(char *name, int modelayer   = -
    1);
private
    /* name of the DOT */
    char *name;
    int modelayer;
    /* 0:meta-meta-model, 1:meta-model, 2:model,
    3:data */
    /* pointer on the set of instances of this DOT
    */
    DOTset *instanceset;
    /- pointer on the DOT type of this DOT */ DOT
    *type;
    /* lists of related FOTs */
    FOTset *fots_from;
    FOTset *fots_to;
}
```

The following C++ class, DO, is a subclass of the DOT class. The class DO is used for instances of objects found in the data layer of the data model. These objects are simply instances of the data model classes defined in the model layer and are not themselves data classes. Although the objects in the data layer could be created as instances of the DOT class described above, it was found to be more efficient, especially in terms of space overhead, if they were created as instances of a subclass of class DOT. In addition, instances of the type scalar are not created as instances of the type DO but are included as data members of the instance of class DO to which the scalars relate. This allows for first access to attributes of an object.

```
/*===========================================
class DO: private DOT {
/*===========================================
/*
    This subclass of DOT is for instances of
    objects in the data layer. The main
    differences between the DO class and the
    DOT class are: objects of the data layer
    cannot be instantiated, (the inherited
    GetInstances method must be made inaccessible);
    the ApplyFunction method is
    implemented differently for FOTs that
    connect to SCALAR values (e.g. ATTRIBUTES).
    Because instances of the SCALAR
    type are not created as instances of the
    type DO, the following rules apply:
        1. SCALAR values are never shared
    by several objects (e.g., the value of an
    attribute).
        2. In queries, SCALAR values are
    never referred to independently. They
    are always referred to as attribute
    values of some complex object.
        3. Scalar values are always
    attached to a complex object (e.g., as an
    attribute of an instance of the ENTITY
    "CLIENT").
/*
public
    /* constructor & destructor */
    DO(char *name = NULL);
    DO(List *attnames, List *attypes, List
        attvalues);
    ~DO( );
    /* get the type of this DO */
    virtual DOT *GetType( );
    /* if idFOT is of type "ATTRIBUTE"; the function
    works on its private attribute data */
    virtual QResult *ApplyFunction(FOT *idFOT);
    virtual QResult *ApplyFunction(char *nameFOT);
    /* attribute management */
    int AddAttribute(char *name, char *type);
    int AddAttributeVal(char *name, void *value);
    char *GetAttribute(char *attname);
    /* some other management methods can be added */
private
    /* in addition to the data member of DOT, these
    lists represent;
    - the names & types of attributes attached to the
    DO (lists of char *);
    the scalar values that are attached as attributes
    to the DO.
    /*
    List *attributesnames;
    List *attributestypes;
    List *attributesvalues;
}
```

The following class DOTset is used to define a set of DOT instance. For example, each object found in the four layers of the data model are defined by a set of DOTs. Thus there is an instance of DOTset for the meta-meta-model layer, for the meta-model layer and for the model layer. These sets provide an additional way to search the layers of data model.

```
/*===========================================
class DOTset {
/*===========================================
/*
    This is for representing sets of DOTS.
    There is an instance of this class for
    each modeling layer. Also, operators
    that produce several DOTs return C++
    instances of such sets. It is convenient
    to define an iterator on such set class.
    This could be inherited from iterators
    defined on standard C++ List class, if
    some standard library is to be used for
    implementing DOTsets.
/*
public
    DOTset(List *listdots = NULL);
    - DOTset( );
    int AddDOT (DOT *dot);
    int RemoveDOT (DOT *dot);
private
    List *listDOTs;
}
```

The class QResult is used to store the results of queries on the data model itself.

```
/*===========================================
class QResult {
/*===========================================
/*
    Used to represent any result set of
    queries as well as of ApplyFunction
    methods. The result of applying a
    function (FOT) to a DOT is always repre-
    sented in the form of a set of values,
    which is itself implemented in the form
    of a list. Each value can be: a) a
```

```
        string of characters (e.g., querying
        about attributes); b) a DOT (e.g.,
        querying complex DOT-like entity
        objects); c) both (e.g., querying about
        model_layer DOTS like "Patent").
*/
public
    QResult (List *listDOT = NULL, List *liststring
    = NULL);
    ~QResult( );
    AddDOT(DOT *dot);
    AddDOTList(List *listDOT);
    AddString(char *string);
    AddStringList(List *liststring);
    List *GetDOTs( ) {return listDOT;}
    List *GetStrings( ) {return listDOT;}
private
    List *listDOT;
    List *liststring;
}
```

The following class FOT is used to represent the relationships that exist between the various data types defined in the database model. As with the DOT class described above, all relationships in the database model are created as C++ instances of this class. However, other classes of relationships in the data model can be created that are instances of the FOT class by creating a new instance of the C++ FOT class and adding the new FOT class to a list (instanceset) of the FOT which is considered to be the class type for the new FOT instance. In this way, classes of relationships can be created in the data model that are both classes and instances of more a general FOT class in a standard object-oriented programming language.

```
/*==============================
class FOT {
/*==============================
/*
    This class is for implementing the FOTs
    in C++. Similar to the DOT class, it is
    used for FOTs of the meta-meta model,
    meta-model or model layers. Some methods
    (GetInstances, RemoveInstances) need to
    distinguish when instances are of type
    ATTRIBUTE, e.g., if this FOT is the
    attribute "INVENTOR_NAME," then instances
    of it are not separate objects--they are
    components of the domain DO (as well as
    present in the range DO for the inverse
    relationship). On the other hand, if
    this FOT is the association "FILES_PAT"
    between DOT "Client" and DOT "PATENT,"
    then its data model instances will be C++
    instances of a subclass FO.
*/
public
    FOT(DOT *domaindot DOT *rangedot, char *name,
    char *inverse = NULL);
    -FOT( );
    void Instantiate(DOT *domaindot, DOT *range-
    dot,
        char *name=NULL, char *inverse = NULL);
    DOT *GetDomainDOT( );
    int IsDomainDOT(DOT *dot);
    DOT *GetRangeDOT( );
    int IsRangeDOT(DOT *dot);
    FOTset *GetInstances( );
    int RemoveInstances( );
    int RemoveInstances( );
    FOT *GetType( );
    char *GetInverse( ); {return inversename}
    char *GetName( ); {return name}
    FOT *GetOID(char *name, int modelayer = -1);
    int IsAttribute( );
```

```
private
    char *name,
    char *inversename;
    int modelayer,
    /* 0:meta-meta-model, 1:meta-model, 2:model,
    3:data */
    /* pointer on the set of database model
    instances of this FOT */
    FOT set *instanceset;
    /* pointer on the type of this FOT */
    FOT *type;
    /* pointer on the domain DOT */
    DOT *domaindot;
    /* pointer on the range DOT */
    DOT *rangedot;
}
```

In the same way that objects in the data layer are instances of the class DO, the relationship between the DO objects are of a type FO. In addition, instances of class ATTRIBUTE are stored as data members in the instance of class DO to which it relates.

```
/*==============================
class FO {
/*==============================
/*
    C++ instances of this class are used for
    connecting C++ instances of the class DO
    (i.e., complex objects in the data
    layer). C++ instances of this class are
    considered as data model instances of
    FOTs from the model layer.
    For space optimization reasons, this
    class is intended to have numerous
    instances since it represents the actual
    data stored in the remote database. This
    class does not inherit from the C++ FOT
    class.
*/
public
    FO(DO *domaindot, DO *rangedot);
    FO( );
    ~
    DO *GetDomainDO( );
    DO *GetRangeDO( );
private
    DO *domaindo;
    DO *rangedo;
}
```

The following class is used in the C++ implementation to store a set of FOTs. The class is used for storing among other things the FOTs that describe the meta-meta-model, meta-model and the model layers of the data model. Each layer of the data model is described by an instance of this class in the same way as the data objects found in the meta-meta-model, meta-model and model layers of the data model are set forth in three instances of the class DOTset.

```
/*==============================
class FOTset {
/*==============================
/*
    This is for representing sets of FOTS.
    There is an instance for each modeling
    layer. Also, operators that produce
    several FOTs return C++ instances of such
    sets.
*/
public
    FOTset(List *listfots = NULL);
    ~FOTset ( );
    int AddFOT(FOT *fot);
```

```
    int RemoveFOT(FOT *fot);
private
    /* not needed if the class inherits from a
    List type */
    List *listFOTs;
}
```

Set forth below is a complete listing required to implement a data model in the C++ programming language. As can be seen, the data model is created as a collection of sets of FOT and DOT data types that describe the contents of the layers of the data model. A data model is created by a supervisory user of the database management system who prepares a short computer program that initializes a model with data corresponding to the data stored in the remote database. If a change is made to the architecture or schema of the database, it is a simple matter to update the various DOTsets or FOTsets that define the data model in order to reflect this change in the user interface.

```
/*================================
class DataModel {
/*================================
/*
    This class represents a complete data
    model. Note that the data layer is not
    explicitly represented. Data is only
    accessible through GetInstances methods
    or ApplyFunction methods.
*/
public
    DataModel( );
    ~DataModel( );
    DOTset *GetDOTModel( );
    DOTset *GetDOTMetaModel( );
    DOTset *GetDOTMetaMetaModel( );
    FOTset *GetFOTModel( );
    FOTset *GetFOTMetaModel( );
    FOTset *GetFOTMetaMetaModel( );
private
    DOTset *model_dotlayer,
    DOTset *meta_model_dotlayer,
    DOTset *meta_meta_model_dotlayer,
    FOTset *model_fotlayer,
    FOTset *meta_model_fotlayer,
    FOTset *meta_meta_model_fotlayer,
}
```

Figure 3:
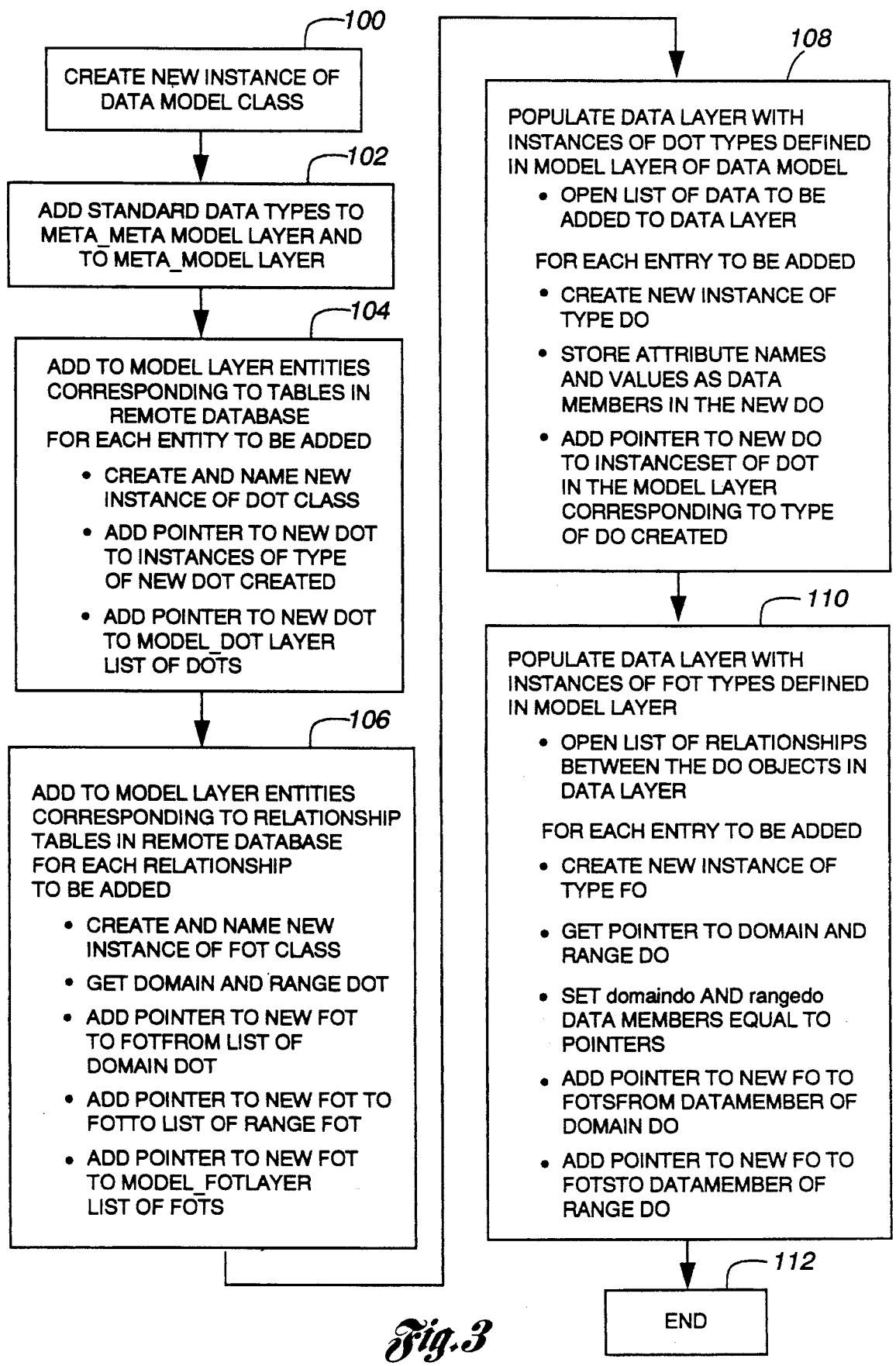
FIG. 3 is a flow diagram illustrating the creation of the data model according to the present invention.

FIG. 3 is a flow chart showing the steps performed by the present invention to create a database model corresponding to the model shown in FIG. 2. The method begins at a step 100, wherein a new instance of the DataModel class is created. At a step 102, the standard data types of the meta-meta-model layer and the meta-model layer are added. Every data model includes DOT and FOT types in the meta-meta model as well as the ENTITY, SCALAR, ASSOCIATION and ATTRIBUTE types in the meta-model layer and STRING and NUMERIC types in the model layer.

The following computer code shows in greater detail how the steps 100 and 102 are actually implemented in the C++ programming language. This code is executed each time a new instance of the DataModel class is created.

```
    /* ----- Constructor of the class DataModel */
    DataModel::DataModel( )
{
    /* create an empty set of DOT for the meta-
    meta-model */
    meta_meta_model_dotlayer=new DOTset( );
    /* create and add a Dot called "DOT" to meta-
    meta-model */
    DOT *metadot = new DOT("DOT");
    meta_meta_model_dotlayer→AddDOT(metadot);
    /* create an empty set of FOTs for the meta-
    meta-model */
    meta_meta_model_fotlayer = newFOTset( );
    /* create and add the meta-meta-type "FOT" as
    a recursive relationship from "DOT" to "DOT"
    */
    FOT *metafot = new FOT(metadot,metadot, "FOT",
    "FOT-");
    meta_meta_model_fotlayer→AddFOT(metafot);
    /* initiate the meta-model layer */
    /* allocate an empty DOT set to the meta-model
    */
    meta_model_dotlayer = new DOTset( );
    /* create and add a DOT "Entity" as instance
    of "DOT" */
    DOT *entitydot=metadot→Instantiate ("Entity");
    meta_model_dotlayer→AddDOT(entitydot);
    /* create and add a DOT "Scalar" as instance
    of "DOT" */
    DOT *scalardot = metadot→Instantiate-
    ("Scalar"); meta_model_dotlayer→AddDOT-
    (scalardot);
    /* allocate an empty FOT set to the meta-model
    */
    meta_model_fotlayer = new FOTset( );
    /* create and add a FOT "attribute" as instance
    of "FOT", between Entity and Scalar */
    FOT *attributefot = metafot→Instantiate-
    (entitydot, scalardot, "attribute");
    meta_model_fotlayer→AddFOT(attributefot);
    /* create and add a FOT "association" as
    instance of "FOT" between Entity and Entity */
    FOT *associationfot = metafot→Instantiate (entity-
    dot, entitydot, "association");
    meta_model_fotlayer→AddFOT(associationfot);
    /* create model layer */
    /* create empty sets of DOTs and FOTs for the
    model */
    model_dotlayer = new DOTset( );
    model_fotlayer = new FOTset( );
    /* initialize by creating and adding standard
    DOTs "String" and "Numeric" */
    DOT *stringdot= scalardot→Instantiate-
    ("String");
        model_dotlayer→AddDOT(stringdot);
        DOT *numericdot = scalardot→Instantiate-
        ("Numeric");
        model_dotlayer→AddDOT(numericdot);
}   /* end of the creation-initialization of the
    model */
```

After step 102, the model layer is populated with entities corresponding to the tables in the remote database in a step 104. For each entity to be added, a new instance of the DOT class is created and given a name. A pointer to the new DOT is added to the instanceset of the type of new DOT that is created. Then, a pointer to the new DOT is added to the model-dot-layer list of DOTs that describes the model layer of the data model.

At a step 106, the model layer of the data model is populated with the relationships that exist between the various entity types added in step 104. This is accomplished by first creating a new instance of the FOT class and giving the new FOT a name. Then, the name of the domain DOT and range DOT for each new relationship is determined. Next, the name of the new FOT instance is then added to the instanceset of the type of FOT added. The name of the new FOT is then added to the fotfrom list of the domain DOT and to the fotsto list of the range DOT. Finally a pointer to the new FOT is added to the model_fotlayer list that describes the relationships between the entities located in the model layer.

After creating the model layer of the database model, the data layer must be populated. The data layer does not contain every instance of a particular data type stored in the remote database but is instead populated by the results of queries completed when the user queries the remote database. The results of a query are returned as lists to the query language processor 22 shown in FIG. 1 and stored in the local cache database 26. Once the local cache database is populated, any further searching that involves narrowing of the queries does not involve searching the remote database directly, but instead can be limited to searching the local cache database.

The local cache database is populated in a step 108 by first creating an instance of a DO type for each object returned by the remote database query. The attribute names and values are stored as data members of the new DO. Then, a pointer to the new DO is added to the instanceset of the DOT in the model layer corresponding to the type of the new DO added.

After the data objects have been created in the local cache database, the relationships between the objects are added in a step 110. This is accomplished by creating instances of the classes defined in the model layer of the data model. First a new instance of the FO class is created. Then a pointer to the domain and range DOT is determined from the results of the remote database query. The domaindo and rangedo data members of the new FO are created. A pointer to the new FO is added to the fotsfrom data member of the domain DO and a pointer to the new FO is added to the fotsto data member of the range DO.

Once the meta-meta-model layer, the meta-model layer and the model layer of the database model have been created and populated, the present invention interrogates the model to determine how the user interface should be generated.

Figure 4:
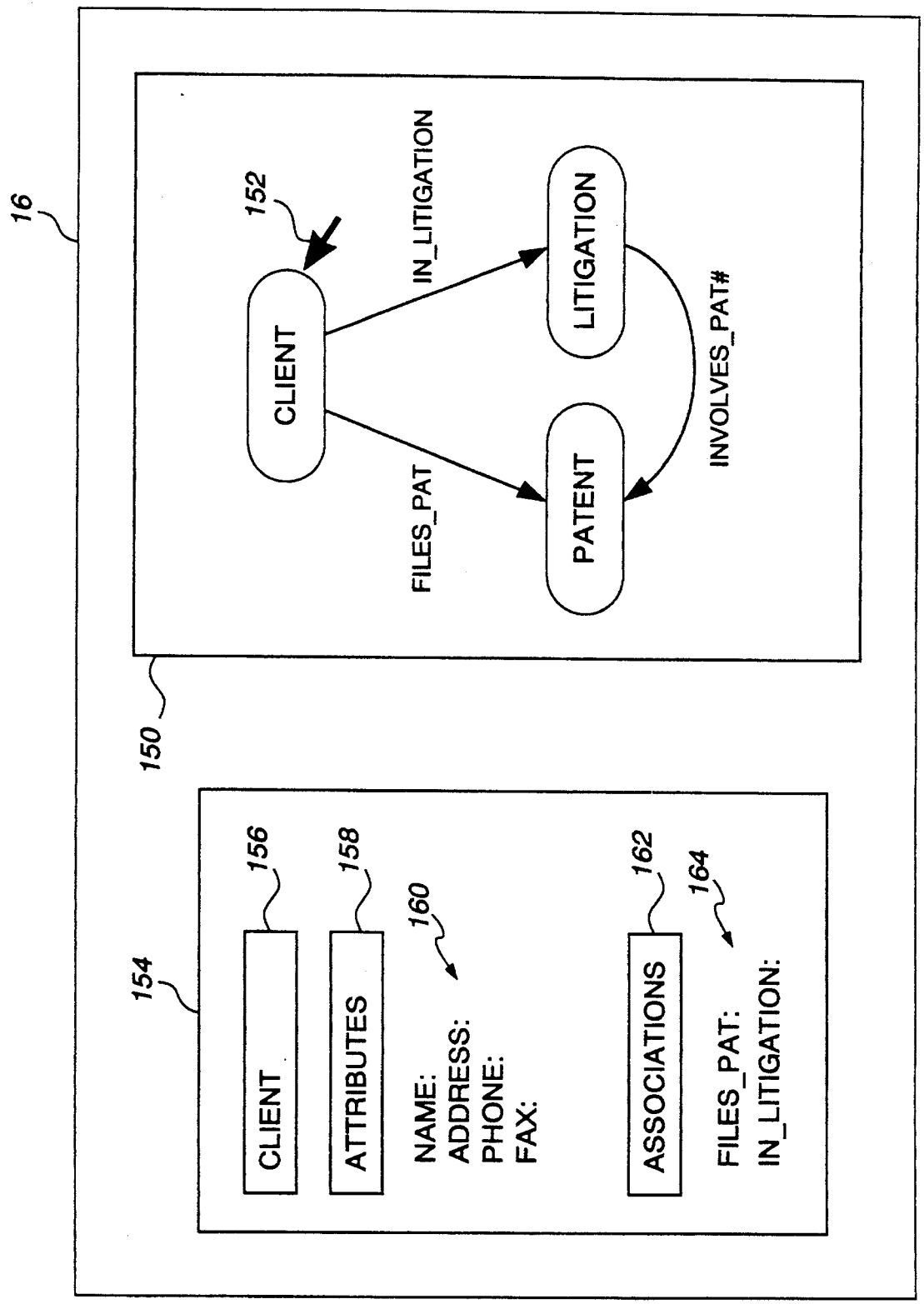
FIG. 4 is a schematic diagram of a representative graphical user interface that may be generated according to the present invention.

FIG. 4 shows an example of a user interface generated by the present invention. In the preferred embodiment of the present invention, the user interface is graphical. However, the present invention could also be used to generate a text-based user interface if desired. The configuration of the user interface displayed on the video display 16 is determined by the semantic data model. In the present embodiment of the invention, the graphical user interface includes a window 150 that visually illustrates the model layer of the semantic data model by displaying each instance of the ENTITY-type objects defined in the data model as well as the instances of the ASSOCIATION type that relate one ENTITY type to another. The instances of the ATTRIBUTE types that relate the various instances of ENTITY type to the instances of SCALAR type could also be displayed on the user interface but are hidden in order to avoid cluttering the window 150 and overwhelming the user with unimportant information.

Also displayed by the user interface is a window 154 that is generated when a user selects either one of the ENTITY objects with a mouse pointer or other selection device 152. Once an ENTITY object has been selected, the present invention interrogates the data model to produce the window 154. The window includes the name of the ENTITY object selected in a box 156, the FOT meta types that are connected to the object selected (if any) in boxes 158, 162 and the instances of the FOT meta types in an area 160 and 164 of the window. To search the remote database, a user types query constraints in the areas 160 and 164 to locate specific instances of the ENTITY type selected. For example, to retrieve all patents filed by "U S WEST", the user types "U S WEST" to the right of the name attribute. The query processor then creates a database query in the remote database's own language to retrieve patent entries in the database that are related to a client entry having the name "U S WEST".

As described above, the results of queries to the database are used to populate the data layer of the database model that is stored in the local cache database in the manner shown at steps 108 and 110 of FIG. 3. Any further searching that narrows the query criteria is performed on the local cache database.

Figure 5:
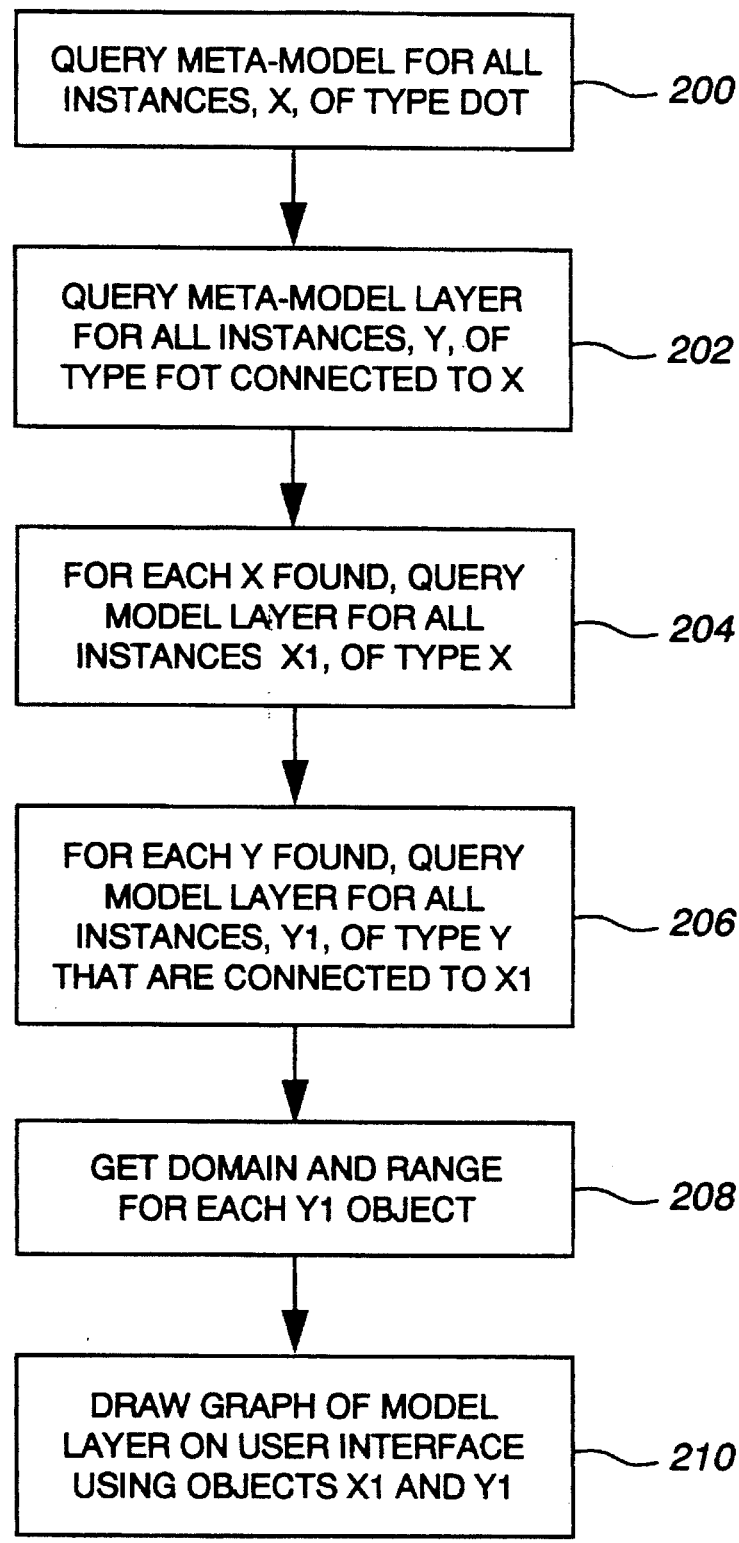
FIG. 5 is a flow diagram illustrating the steps taken by the present invention to query the semantic data model to generate the graphical user interface.

FIG. 5 is a flow chart showing the steps performed by the present invention to generate a graph of the model layer of the data model. In order to generate a corresponding graph of the model layer, the model layer must be dynamically interpreted. Consequently, internal dialogs are required to query the model layer to determine the structure of the model layer. In order to generate the graph and query the data model, a small set of low level access functions must be provided. These functions include: getting the type of a DOT object in the data model; getting all the instances of a DOT object in the data model; getting the type of a FOT object in the data model; getting all instances of a FOT object in the model; getting the domain and range of a FOT object and getting all related FOTs that extend from an object and extend to and from a FOT object in the data model. Given the description of the C++ classes used to implement the data model, the implementation of these functions is considered well within the scope of one skilled in the art of computer programming.

The first step of producing the graph of a database model is to query the meta-model layer of the database model for all instances X of type DOT. A first query is issued at step 200 as follows: Q1:(DOT:X)>>Y. In the database model shown in FIG. 2, step 200 returns ENTITY and SCALAR. Next, at step 202, the meta-model layer is queried for all instances of Y-type FOT that are connected to X. A second query is issued as follows: Q2:(DOT:X:__.FOT:Y)>>X,Y. Using the data model example, step 202 returns ASSOCIATION and ATTRIBUTE.

In order to generate the graph, all instances of the Xs (ENTITY and SCALAR) are needed to create nodes of the graphical network and all instances of the Ys (associations and attributes) are needed in order to create the edges of the graph. A third query is generated in order to access the node/edge information from the data model, Q3:(X:X1:__.Y:A^X2:)>>X1, A, X2. Here, two queries of the type Q3 are generated: one for each pair (X,Y) generated above at steps 200 and 202:

Q3_1: (Entity:X1:__attribute:A^AX2:__)>>X1,A, X2

Q3_2: (Entity:X1:__association:A^X2:__)>>X1,A,X2.

In other words, Q3 is a "query template" that is pre-coded and that will be instantiated depending on the values of X and Y found before for this meta-model. The query Q3_2 produces in turn the following triples X1,A, X2 for our example:

(Client,files_pat, Patent)

(Client, in_litig, Litigation)

(Litigation, involves_pat#, Patent).

These triples are then interpreted as triples (node1, edge, node2) when displaying the graph on a display.

All instances, X1, that are instances of type X are determined at step 204. Referring to FIG. 2, this step produces CLIENT, PATENT, STRING and LITIGATION. At step 206, for each Y found in step 202, all instances Y1 of type Y that are connected to the instances X1 are determined. In the example shown, step 206 produces NAME, FILES PAT, IN LITIGATION, and INVOLVES PAT#. Next, the domain and range for each Y1 object are determined at step 208.

In summary, the following internal dialog is generated, pre-coded with meta-level queries or query templates:

Execute Q1: (DOT:X)>>X

Build a list of values: Lx, with the results for X

For each instance of X in Lx,

Execute Q2: (DOT:X:_.FOT:Y)>>Y

Build a list of values: Lxy, with the results for that correspond to this value of X For each instance of X in Lx, For each instance of Y in Lxy for this X, Generate and Execute Q3: (x:X1:_.Y:A^AX2:)>>X1,A, X2

Build a list of triples Lt with the results.

After step 208, enough information is provided by the data model to generate a graph of the model layer using the objects X1 and Y1. The graph is generated whereby all the objects X1 are shown as nodes of the graph and all the objects Y1 are shown as edges between the nodes.

In the preferred embodiment, some precoded filter instructions may be included to remove those instances which are of type ATTRIBUTE or SCALAR types in order to avoid generating a cluttered graph. These filters are precoded into the software that queries the database model as follows:

Execute Q1: (DOT:X) & (X# Scalar)>>X

Build a list of values: Lx, with the results for X

For each instance of X in Lx,

Execute Q2: (DOT:X:_.FOT:Y) & (Y #attribute)>>Y

In fact, for the sake of more flexibility, the pre-coded queries or query templates of the internal dialogs do not explicitly appear in the program code, but are stored in a file accessible by a user interface designer. The designer can then modify this file in order to bring the required modifications to the queries of the dialog (e.g. filter out "Scalars" and "attributes"). In other words, the internal dialog as actually coded looks like the following:

Execute query: Q1(X)

Build a list of values: Lx, with the results for X

For each instance of X in Lx,

Execute query: Q2(X,Y)

Build a list of values: Lxy, with the results for Y that correspond to this value of X For each instance of X in Lx, For each instance of Y in Lxy for this X, Generate and Execute query: Q3(X,Y,X1,A,X2)

Build a list of triples Lt with the results, where Q1, Q2, Q3 are query names or query identifiers (QID). The file of associated modifiable queries is structure in the following way:

Q1(X)=(DOT:X)>>X

Q2(X,Y)=(DOT:X: .FOT:Y)>>Y

Q3(X,Y,X1,A,X2)=(X:Xi:_.Y:A^X2:)>>X1,A,X2, where each entry is a couple (QID, parameterized query). The link between the queries in the file and their identifier (QID) in the program is made at run-time during an initialization phase that reads the content of the query file. In our example, this file has actually been modified in order to filter out Scalars and attributes, as follows:

Q(X): (DOT:X) & (X#Scalar)>>X

Q2(X,Y): (DOT:X:_.FOT:Y) &(Y# attribute)>>Y

Q3(X,Y,X1,A,X2): (X:X1:_.Y:A^X2:_)>>X1,A,X2.

The displayed graph which corresponds to the resulting list of triples Lt will be like the one in our previous example, without the "la _firm" attribute and without the "String" Scalar DOT.

Figure 6:
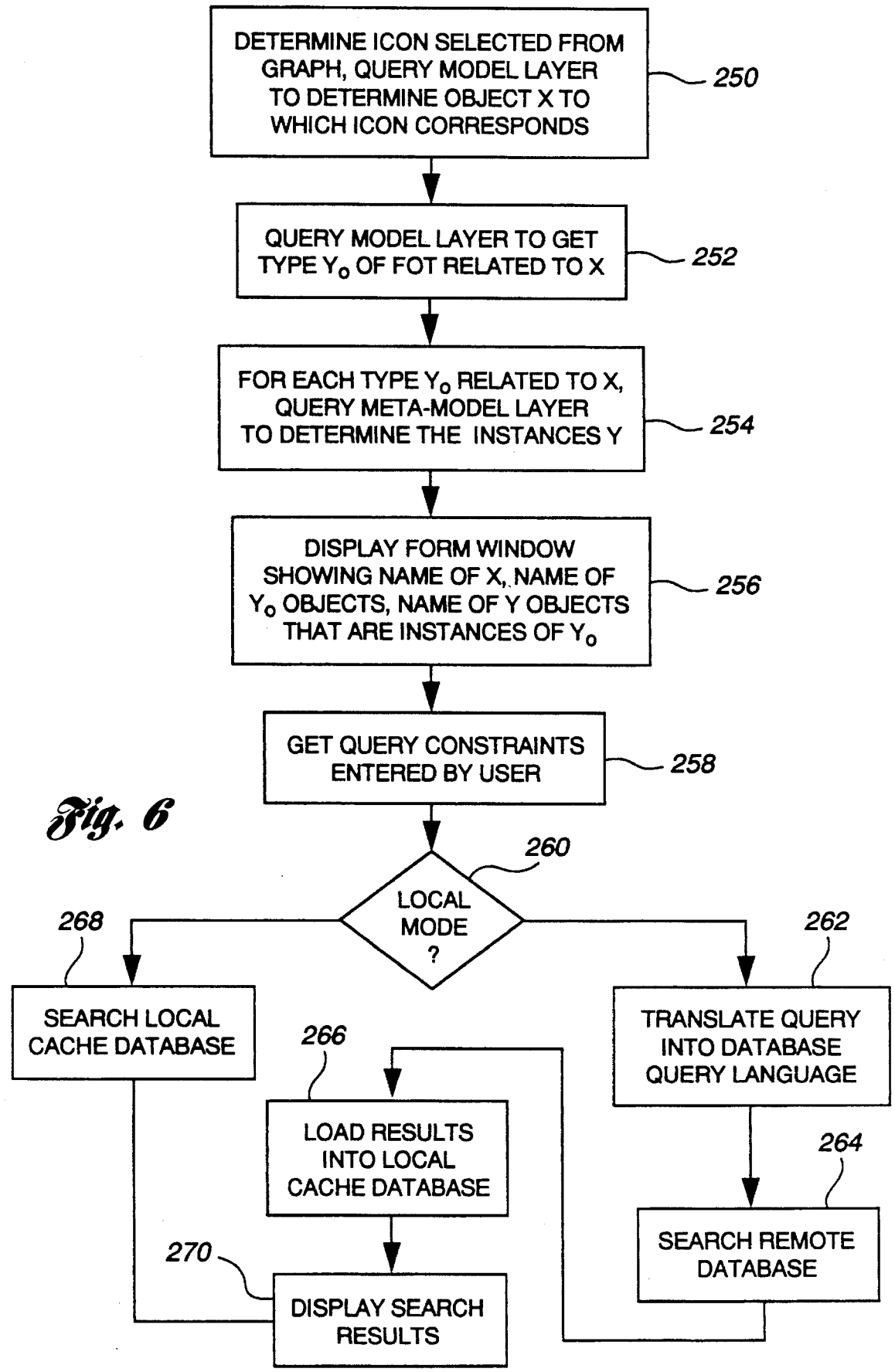
FIG. 6 is a flow diagram showing the steps taken by the present invention to query the semantic data model to generate a form in the graphical user interface.

Once the graph of the database model has been displayed, the user interface waits for a user to select an object. FIG. 6 shows the steps taken by the present invention to create a form corresponding to an object selected. At step 250, the model layer of the data model is queried to determine an instance of type ENTITY corresponding to the icon a user selected. Next, at step 252, the model layer is queried to determine all the kinds of relationships $Y_o$ that concern the entity "CLIENT" For example, if the user has selected the CLIENT object, this step returns ATTRIBUTE and ASSOCIATION. At step 254, the model layer is queried to determine the name of the instances Y in each $Y_o$ related to X. Again, assuming that the user has selected the client object, these steps operate to find the CLIENT object in the data model and return NAME, FILES_PAT and IN_LITIGATION associated with the client object.

The pre-coded internal dialog for generating a form corresponding to an icon selected by the user is as follows:

Execute query: (Entity:X.Y)>>Y

Build a list of values: Ly, with the results for Y

For each instance of Y in Ly,

Generate and Execute the query: (X:_.Y:A)>>A

Build a list of values: La, with the results for A

In our example, the first query, (Entity:Client.Y), will return all the kinds of relationships that concern the Entity "Client": attribute, and association. Then, for each of these kinds of relationships, we get the name of their instances for Client:

(Client:_.attribute:A)>>A returns La1={name, address, phone}, and:

(CLient:_.association:A)>>A returns La2={files, in_litig}.

As described above, the queries are not actually explicitly coded in the program, but in an associated file where they can be modified by the user interface designer. Only their identity, or QID (e.g., Q1, Q2, etc.) appears in the code of the program. These results are sufficient for dynamic display of a form for Client, that contains:

Client:

attributes name:

address:

phone:

associations files: 'in_litig:..

At step 256 the form is then displayed showing the name of the icon selected, the names of the $Y_o$ objects (ASSOCIATION and ATTRIBUTE) and the Y objects (NAME, FILES PAT and IN LITIGATION) that are instances of the $Y_o$ objects. These are displayed as shown in window 154 of FIG. 4. Once the form has been displayed, it is determined if the user has entered one or more query constraints at step 258. It is then determined if the software is operating in a "local" mode at step 262. If the system is operating in a local mode, the data to be searched have been previously stored in the local cache database. If not, the remote database is searched. Assuming the System is not operating in a local mode, the query constraints are translated into the remote database's own query language at a step 262. The remote database is then searched at a step 264 and the results are loaded into the local cache database at a step 266 as described above.

If the system is operating in a local mode and the data to be searched are already located in the local cache database, the local cache database is searched for all instances of data meeting the query constraints. In either case, the search results are displayed to the user at a step 270 in any of a number of ways which will be apparent to those skilled in the art. Preferably, a scrollable window is opened allowing the user to browse the results of the search.

The user interface can adapt dynamically to any database model at run-time rather than at compile-time. For instance, if a user could dynamically modify the model or even the meta-model, then in the same session it would be possible to display/update the corresponding user interface representations (e.g., a new form). This is because the user interface dynamically acquires information about the meta-model and the model through the above-described internal dialogs. In order to write the query templates that are pre-coded in the internal dialogs, only the meta-meta-model has to be initially known. The internal dialogs can then determine everything in the data model. There is an exception, however, if it is desirable to "hide" some specific types, such as "attributes" and "Scalar" in the previous example, then meta-types "Scalar" and "attribute" need to appear in the queries of the internal dialogs.

The language approach to access and select meta-data gives the flexibility and the accuracy needed for accommodating any special user interface need, e.g., in our previous example, select all DOTs but not "Scalar" and Scalar instances, and not attributes for entities. Only the internal dialog needs to be changed, and such changes do not require re-compiling the user interface component. Changing the queries of the dialog requires editing the file where they are. This file is only read and the queries interpreted at run-time.

In order to access meta-data as well as data, only one language is used by the user interface components. Therefore, the internal dialogs are the only interface between user interface and the model/data. This is more powerful than having two distinct languages, one for building the user interface representations (reading meta-data) and the other for the user queries (reading data). Indeed, this distinction may not hold true anymore in advanced user-interfaces: the user interface representations may depend on the data (e.g., the user interface may "decide" to customize the presentation of the data resulting from a user query, depending on the form of the data, like a "tree of icons" for a family tree), and conversely, the user may want to query the meta-model (e.g., in natural language interfaces, where the user may ask questions like "what are the attributes of an entity like Client").

The above-described features have been made possible due to the capability of the internal dialogs to query both data and models ("higher-order" language) as well as to the underlying modeling paradigm (semantic modeling with explicit meta-model).

The language used for implementing the internal dialogs must satisfy some properties in order for the internal dialogs to be able to interface user interface units and data/model units. The language must provide some surrogates (variables) for the manipulation of any object, either atomic objects (like a simple number for serial_number values) or complex objects (like a patent or a litigation). SQL is an example of query language that does not fully provide this feature, i.e., there is no variable that can represent tuples or tables.

The access to data is made through functions. Functions are used to represent any relationship between data. For example, getting the name of a Client that is represented by the variable X is achieved by evaluating the function name of X (i.e. name(X)). Similarly, obtaining the Patents filed by a Client X results from the evaluation of the functional expression: files(X), where files is a functional version of the "files" relationship between Client and Patent. The functions should be able to return sets: files(X) actually may return a set of objects of the type "Patent". The functions can be composed: serial_number(files(X)) returns the set of the serial numbers of all the patents filed by the Client X.

The language must be declarative in its selection statements, that is, it should not provide control statements like those found in programming languages (e g iterative control statements "for . . . ", "while . . . ", "do. . . ", conditional statements "if . . . then" or branching statements "call . . . ", "execute . . . ", "go to . . . ", "return . . ."). In other words, it should express selection statements that specify some conditions or constraints without specifying how to execute, enforce or check them. For example, selecting Patents filed after January 90 by U S WEST should not require to specify more than the conditions (X is a Client) AND (name (X) is "U S WEST") AND (file_date (files (X)) after 90/01/01) . Answering this query is like finding all the possible values for X that satisfy these conditions. The query for this example can be written as follows:

(Client:X.name="U S WEST") & (X. files. file_date >90/01/01)>>X.

The language must have the capability of processing queries where variables are used in place of functions. For example, F(X) is a functional expression where the function is in variable F and the argument in variable X. In the same way as X may be considered as a result for queries involving such expressions, F can also be used to get function names as results. For example, the condition: (X is a Litigation) AND (F(X) ="Burlington") will select all the pairs of values (X,F) satisfying the condition. That is, in our example, all the Litigation instances that refer to "Burlington", and how they refer to "Burlington" (either as defendant_name, or as court_name, or as court_location: all these attributes names are possible instances of the function variable F). In this example, the query can be coded as: (Litigation:X.F= "Burlington")>>X,F. The query to get all the attributes of the entity Litigation is: (Litigation: _attribute:A)>>A) where A is a variable for functions of the type attribute.

The query language must also be able to query the meta-data as well as the data. For a full expression power, this capability should rely on two features:
1) an explicit modeling of the meta-model; and 2) higher order capability.

The meta-model must use the same modeling constructs as does the schema or model (e.g. if the schema is an object-oriented model, then the meta-model should also be described using the same object-oriented constructs). This is a modeling requirement rather than a query language requirement. The idea behind a consistent meta-modeling is that queries over data are expressed using terms and functions of the schema (or model). Therefore, queries over the model itself (or schema) are likely to be expressed using terms and functions of the meta-model. Therefore, if we want to use the same language for data and meta-data querying, there should be a similar relationship between meta-model and model as between model and data (i.e., the model is considered as "data" for the meta-model, and same functional concepts are used for meta-modeling as for modeling). For example, getting all the entities associated to Client can be done by evaluating the functional expression: Entity:Client.association, where the meta-type "association" is used as a function and the entity "Client" as an object in the argument.

As mentioned above, higher-order capability allows the use of variables in place of function names. This is another way to query meta-data. Meta variables (or higher-order variables) should not be restricted to function names. They should be usable at any place of an expression: (i) object types (e.g. in the expression: (X:Client.name="John"), the variable X captures the type (meta-type) of the entity "Client" (i.e., Entity in our example)), (ii) function types (e.g. in the expression: (Patent_.X:inventor_name), the variable X captures the type of the function "inventor_ name", that is "attribute"), (iii) range of functions (they are also object types. For example, in the expression: (Client:_ address^X:_, X) captures the type of the attribute address, that is "String").

In order to satisfy the requirements above, the conditional (selection) part of they query should be processed as a set of constraints. For example, query language processing uses constraint solving techniques over finite domains.

A query language that observes the properties previously described requires certain features of the data model. First, the data model must provide a functional interface to all the relationships. All relationships between objects must be usable as functions. In other words, the data model must present a functional interface to the query processor. Such an interface can be represented using a unique, meta-function "f compute".

f_compute(object,function)—>{set of objects or values}.

f-compute applies a given function to an object and returns a set of objects or values (containing a single object or value if the function is monovalued). The expression f_compute(object,function) is equivalent to the expression function(object). The function argument can be any semantic relationship between objects: attribute, association, inheritance, composition, etc., depending on the semantic concepts used in the data-model. The object argument can be any object at data level, but also any object type (class) (e.g. f_compute-(Patent,attribute) returns all the attribute types of the entity Patent, i.e. {Numeric, String}), or any meta-type (e.g. f_compute(Entity, FOT) returns all the meta-types connected to the meta-type Entity by a FOT, i.e. {Scalar}). This extension of the functional interface to the meta-model and meta-meta-model is greatly facilitated if they are also represented as functional models.

The objects in argument (and in result) of functions must be uniquely identified. These identifiers (Objects IDs) are directly manipulated by the functions as arguments and results. An object-oriented model satisfies the object-identity property. For example, the semantic model described above can be implemented using an object-oriented representation system, ROCK. ROCK is a C++ library that provides OIDs in the form of C++ pointers. In other words, object identifiers (OIDs) and atomic values of type Scalar (e.g., numbers, character strings) constitute the domains and ranges of any function. The types and meta-types also should have OIDs.

Second, the data model must also provide explicit representation of the meta-model using the same constructs as the model. The meta-model is represented in quite a similar way as the model, from an implementation point of view. In other words, there is the same relationship between the meta-model and the schema (or model) as between the schema and the data. That is, an element of the model (say Client entity) plays two roles: (1) it is a type for the Client instances (data level), and (2) it is itself an instance of the meta-type Entity (meta-model level). Most commercial object-oriented knowledge representation systems do not allow for a representation of an object that can be used both as a class and as an instance. For example, ROCK is in this category. With such systems, the implementation of a data model and meta-model can go around this limitation by associating two objects for each type of model and each meta-type of the meta-model: in our example, to the entity Client is actually associated a pair <instance _view, class_view>. When Client has to be considered as an "object" of type Entity (e.g., in the meta-level expression: Entity:Client.attribute) then the instance_view is used and operated. When Client has to be considered as a type (e.g., type of the variable X in the expression: Client:X.name="U S WEST") then the class_view is used. The objects of the data level contain only instance_views, while the objects of the meta-meta-model level contain only class_views (they are instances of nothing).

For the query processor to perform efficiently (especially with regard to meta-level capabilities), the implementation of a data model must also provide the following functions in its functional interface:

(f1) type_of_DOT (object)—>object (f2) instance_of_DOT (object)—>{set of objects}

(f3) type_of_FOT (function)—>function (f4) instance_of_FOT (function)—>{set of functions}

(f5) FOT_from (function—>object (f6) FOT_range (function)—>object

These function prototypes must be defined in order to perform on any modeling layer. These modeling layers are denoted by: ML1 for data layer, ML2 for schema or model layer, ML3 for meta-model layer, ML4 for meta-meta-model layer. The fact that the modeling layers are implemented in a similar way greatly favors this multipurpose feature. The "object" arguments are represented by Objects IDs, the "function" arguments may be simply function names, or also OIDs if the function is represented itself as an object in the implementation. The functions do not need to perform on Scalar instances (i.e., numeric values or character strings).

In the function f1, the term "object" may denote an object (a DOT) of any of the modeling layers ML1, ML2, ML3. It returns the type of object (in layers ML2, ML3 OR ML4). The function f2 returns all the instances of a given type. The object argument is in ML2, ML3 or ML4. The resulting objects are in ML1, ML2 or ML3. The function f3 returns the meta-function (meta-type) of a given function, e.g., type_of_FOT(files) returns association. The argument is a FOT in ML2 or ML3. The result is a FOT in ML3 or ML4. The function f4 returns all the functions instances of a given meta-function, e.g. {files, in_litig, patent} is the result of instance_of_FOT (association). Its argument can belong to ML3 or ML4. Its results belong to ML2 or ML3. The function f5 returns the domain-DOT of a given function. For instance, FOT_from (files) returns Client. The argument and the result belong to the same layer among ML2, ML3 or ML4. The function f6 returns the range-DOT of a given function. For instance, FOT_range (files) returns Patent. The argument and the result belong the same layer among ML2, ML3 or ML4.

The following C++ listing shows how the data model is actually queried to generate the user interface or to search the local cache database that has been populated with objects. The function "ApplyFunction" is applied to an object (either of type DOT or type DO). The function takes as its argument the name of a FOT type that is connected to the DOT or DO object. The function returns the instances of the domain and range objects connected to the DOT or DO object. For instance, CLIENT→ApplyFunction (ASSOCIATION) returns PATENT and LITIGATION. Similarly if the function is applied to an instance of the DO class such as U S WEST→ApplyFunction (FILES_PAT) would return all the patent applications filed by U S WEST that are stored in the local cache database. The function allows the FOT objects to be used as functions to query the data model itself or the local cache database. For example, applying the FOT "IN LITIGATION" to the DO "U S WEST" returns all instances of type LITIGATION that are either in the range or the domain of the type of the U S WEST object.

As can be seen from the following code, the "ApplyFunction" function works by checking to see the type of the object on which the function is applied is the domain of the FOT (idFOT) that is applied to the object. If so, the fotsfrom list of the type of object on which the FOT is applied is read to find all the FOTs that are instances of type idFOT (i.e., the type of the FOT applied to the object). The function then gets all the instances of DOTs (or DOs) that are in the range of the FOTs that are of type idFOT.

For example, CLIENT→ApplyFunction ("ASSOCIATION") gets the type of CLIENT (i.e., ENTITY) and gets the domain of ASSOCIATION (also ENTITY). Then the function gets all the FOTs in the fotsfrom list of the CLIENT DOT (i.e., FILES_PAT and IN_LITIGATION and NAME). Only FILES_PAT and IN_LITIGATION are of type ASSOCIATION; therefore, only the ranges for these FOTs are returned (PATENT and LITIGATION).

If the type of object on which the function is applied is not in the domain of the FOT, the same method is used except the fotsto list is used and all instances that are in the domain of the FOTs are returned. For example, LITIGATION≧ApplyFunction (ASSOCIATION) returns CLIENT and PATENT.

There is also shown below a separate listing for the "ApplyFunction" function when it is applied to members of the class DO. A separate routine is used because certain data objects (instances of SCALARS and ATTRIBUTES) are stored as data members of the DO and not as separate objects. As was indicated above, this was done in the present embodiment of the invention solely for performance reasons (i.e., saving memory space). Otherwise the operation of ApplyFunction for the objects of class DO is nearly the same as that described above.

```
/* -----ApplyFunction method for class DOT */
QResult *DOT::ApplyFunction(FOT *idFOT);
{
    this C++ function applies a data model FOT
    to a DOT belonging to its domain. The result
    is a set of DOTs belonging to its range.
    */
    /* initialize as empty a temporary QResult
    called dotset */
    /* determine if the DOT on which we apply this
    function (the "DOT of interest") is instance
    of the domain DOT or in the range DOT of idFOT
    */
    DOT *dotype = this→GetType( );
    if (dotype = idFOT* →GetDomainDOT( ) ) {
        /* if the DOT of interest is domain dot: */
        /* for each FOT idfot in the set of FOTs
        attached to this DOT (datamember fots_from)
        dot:
            if idfot is an instance of idFOT then:
                -take the range DOT of idfot idfot→Get-
                RangeDOT( )
                -add this range DOT to the result set
                dotset dotset→AddDOT (idfo→GetRangeDOT( ))
        */
    }
    if (dotype = idFOT→GetRangeDOT( )) {
        if the DOT of interest is range dot: */
        /* for each FOT idfot in the set of FOTs
        attached to this DOT (datamemberfots_to)do:
            if idfot is an instance of idFOT then:
                -take the domain DOT of idfot (idfot→
                GetDomainDOT( ))
                -add this domain DOT to the result set
                dotset
        */
    }
    /* return the set of DOTs dotset to the caller */
    return dotset;
}
/* ----- ApplyFunction method for class DO */
QResult *DO::ApplyFunction(FOT *idFOT);
{
    /* this C++ function applies as data model FOT to
    a DO belonging to its domain. The result is a set
    of DOs belonging to its range. In the program
    above: clientdo1→ApplyFunction("FILES_PAT") will
    return the set of DOs (patentdo1, patentdo2)
    */
    */ initialize as empty a temporary QResult called
    doset */
    /* determine if the DO on which we apply this
    function (the "DO of interest") is instance of the
    domain DOT or in the range of DOT of idFOT */
    DOT *dotype = this→GetType( );
    if (dotype = dFOT→GetDomainDot( )) {
        /* if the DO of interest is in domain dot: */
        if (idFOT→IsAttribute( )) {
            /* idFOT is a FOT of type "ATTRIBUTE" */
            /* get the ATTRIBUTE value and put it in
            doset: */
            char *attval = this→GetAttribute(idFOT→
            GetName( ));
            doset→AddString(attval);
        }
        else {
            /* idFOT is an FOT of any other type */
            /* for each FO idfo in the set of FOs attached
            to this DO (datamember fots_from) do:
                if idfo is an instance of idFOT then:
                    -take the range Do of idfo (idfo→
                    GetRangeDO( ))
                    -add this range Do to the result set
                    doset
            */
        }
    }
    if (dotype = idFOT→GetRangeDOT( )) {
        /* if the DO of interest is range dot: */
        /* for each FO idfo in the set of FOs attached
        to this DO (datamember fots_to) do:
            if idfo is an instance of idFOT then:
                -take the domain DO of idfo (idfo→*Get
                DomainDO( ) )
                -add this domain DO to the result set
                dotset
        */
    }
    /* return the set of DOs dotset to the caller */
    return doset;
}
```

The benefit of the data model formed according to the present invention is that the same search primitives can be used to search any layer of the semantic data model from the meta-meta-model layer to the data layer. This is because each model layer uses the same semantic constructs. Therefore, by starting at any layer in the database model, it is always possible to determine the types of the objects in the layer above it as well as the instances of the objects in the layer below it using the same primitive routines described above. Furthermore, the database model is easily adaptable to changes that may occur in the remote database. By updating the model, the software which generates the user interface can dynamically be updated to reflect the change in the remote database without having to recode the entire program which generates the user interface.

As can be seen, the present invention generates a graphical user interface in a way that is not dependent upon the query language or structure of the underlying database. The present invention utilizes the semantic database model to determine at run time how the graphical user interface should be generated. Therefore, there is no need to change the software that generates the user interface to reflect a change in the underlying data. For example, if a new field were to be added to the database, this new field could be added to the semantic database model. When the database model is queried, the new field would be discovered and automatically placed in the user interface. Thus, there is no need to recode or recompile the system that generates the user interface to reflect such a change in data. Similarly, the present invention can be used on virtually any database system. The graphical user interface will appear to operate in the same way regardless of the structure of the underlying database. Therefore, there is no need to train operators to use a new query language and new user interface for each database system used.

While the preferred embodiment of the invention has been illustrated and described, it will be appreciated that various. changes can be made therein without departing from the spirit and scope of the invention.

What is claimed is:

1. A method for generating a user interface adaptable to various database management schemas each having a database containing a plurality of data items, the method comprising:

generating an intermediate data model from the database having a model and a meta-model categorizing the plurality of data items as either a data object type or a functional object type, the data object type representing a type of data contained in the database and the functional object type representing a plurality of relationships existing between instances of a plurality of the data object types, the model containing a plurality of entities and a plurality of relationships, the plurality of data items being instances of the plurality of entities and the plurality of relationships, and the meta-model containing a plurality of entity object types and a plurality of relationship object types, the plurality of entities being instances of the plurality of entity object types and the plurality of relationships being instances of the plurality of relationship object types, and the plurality of entity object types further being instances of the data object type and the plurality of relationship object types further being instances of the functional object type;

executing a plurality of internal dialogs to retrieve data representing the plurality of entity object types, the plurality of relationship object types, the plurality of entities and the plurality of relationships so as to determine the model and the meta-model of the intermediate data model;

generating the user interface independent of the database based on the data retrieved by the internal dialogs; and displaying the user interface.

2. The method as recited in claim 1 wherein the step of executing the plurality of internal dialogs comprises:

querying the meta-model to determine a name for each of the plurality of entity object types;

querying the meta-model to determine a name for each of the relationship object types;

querying the meta-model to determine the name of each of the plurality of relationship object types associated with each of the plurality of entity object types;

querying the model to determine a name for each of the plurality of entities; and querying the model to determine a name for each of the plurality of relationships.

3. The method as recited in claim 2 wherein the step of generating the user interface comprises:

querying the model to determine a domain and range for each of the plurality of relationships.

4. The method as recited in claim 3 wherein the step of querying the model to determine the domain and range comprises:

querying the model to determine the name of the entity corresponding to an origin of the relationship; and querying the model to determine the name of the entity corresponding to a destination of the relationship.

5. The method as recited in claim 4 wherein the step of displaying the user interface comprises:

displaying the name of each of the plurality of entities; and displaying the name of each of the plurality of relationships.

6. The method as recited in claim 5 wherein the user interface is a graphical network and wherein the step of displaying the user interface comprises:

displaying a plurality of nodes corresponding to the name of each of the plurality of entities; and displaying a plurality of edges corresponding to the name of each of the plurality of relationships, each of the plurality of edges connecting the entity corresponding to the origin of the relationship to the entity corresponding to the destination of the relationship.

7. The method as recited in claim 5 wherein the user interface has a predetermined format and wherein the step of displaying the name of each of the plurality of relationships includes displaying the name of each of the plurality of relationships relating to each of the plurality of entities.

8. The method as recited in claim 7 wherein the ,step of displaying the user interface further comprises:

displaying the name of the entity corresponding to the destination of each of the plurality of relationships to generate at least one connected entity; and displaying an entry field for each connected entity for manipulation by the user.

9. The method as recited in claim 5 further comprising:

querying the meta-model to determine all of the relationship object types that relate to an entity selected by a user; and querying the model to determine all of the relationships corresponding to each of the relationship object types.

10. A system for generating a user interface adaptable to various database management schemas comprising:

a database containing a plurality of data items; and a computer system coupled to the database including:

means for generating an intermediate data model from the database having a model and a meta-model categorizing the plurality of data items as either a data object type or a functional object type, the data object type representing a type of data contained in the database and the functional object type representing a plurality of relationships existing between instances of a plurality of the data object types, the model containing a plurality of entities and a plurality of relationships, the plurality of data items being instances of the plurality of entities and the plurality of relationships, and the meta-model containing a plurality of entity object types and a plurality of relationship object types, the plurality of entities being instances of the plurality of entity object types and the plurality of relationships being instances of the plurality of relationship object types, and the plurality of entity object types further being instances of the data object type and the plurality of relationship object types further being instances of the functional object type;

means for executing a plurality of internal dialogs to retrieve data representing the plurality of entity object types, the plurality of relationship object types, the plurality of entities and the plurality of relationships so as to determine the model and the meta-model of the intermediate data model; and means for generating the user interface independent of the database based on the data retrieved by the internal dialogs; and a display coupled to the database and the computer system for displaying the user interface.

11. The system as recited in claim 10 wherein the means for executing the plurality of internal dialogs comprises:

means for querying the meta-model to determine a name for each of the plurality of entity object types;

means for querying the meta-model to determine a name for each of the relationship object types;

means for querying the meta-model to determine the name of each of the plurality of relationship object types associated with each of the plurality of entity object types;

means for querying the model to determine a name for each of the plurality of entities; and means for querying the model to determine a name for each of the plurality of relationships.

12. The system as recited in claim 11 wherein the means for generating the user interface comprises:

means for querying the model to determine a domain and range for each of the plurality of relationships.

13. The system as recited in claim 12 wherein the means for querying the model to determine the domain and range comprises:

means for querying the model to determine the name of the entity corresponding to an origin of the relationship; and means for querying the model to determine the name of the entity corresponding to a destination of the relationship.

14. The system as recited in claim 13 wherein the display includes means for displaying the name of each of the plurality of entities and means for displaying the name of each of the plurality of relationships.

15. The system as recited in claim 14 wherein the user interface is a graphical network and wherein the display includes means for displaying a plurality of nodes corresponding to the name of each of the plurality of entities and means for displaying a plurality of edges corresponding to the name of each of the plurality of relationships, each of the plurality of edges connecting the entity corresponding to the origin of the relationship to the entity corresponding to the destination of the relationship.

16. The system as recited in claim 14 wherein the user interface has a predetermined format and wherein the display comprises:

means for displaying the name of each of the plurality of relationships relating to each of the plurality of entities;

means for displaying the name of the entity corresponding to the destination of each of the plurality of relationships to generate at least one connected entity; and means for displaying an entry field for each connected entity for manipulation by the user.

17. The system as recited in claim 14 further comprising:

selection means, coupled to the display, for selecting an entity;

means for querying the meta-model to determine all of the relationship object types that relate to the entity selected by a user; and means for querying the model to determine all of the relationships corresponding to each of the relationship object types.

18. The system as recited in claim 17 wherein the selection means is a keyboard.

19. The system as recited in claim 17 wherein the selection means is a mouse.

* * * * *